(No Model.) 2 Sheets—Sheet 1.
F. ANDERSON.
WHEELED HARROW.
No. 490,132. Patented Jan. 17, 1893.
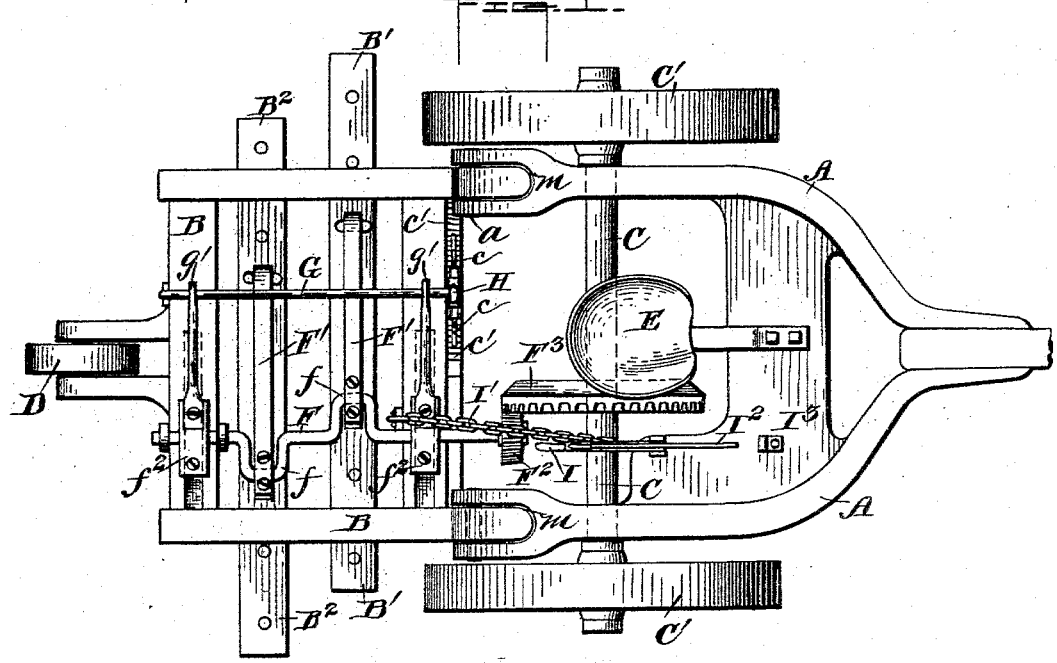
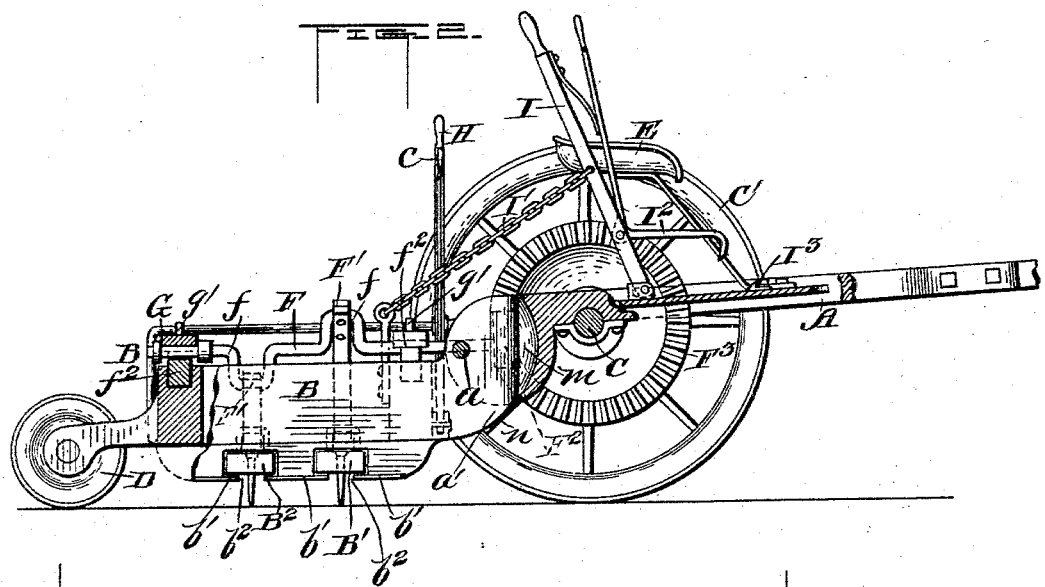

(No Model.) 2 Sheets—Sheet 2.
F. ANDERSON.
WHEELED HARROW.
No. 490,132. Patented Jan. 17, 1893.
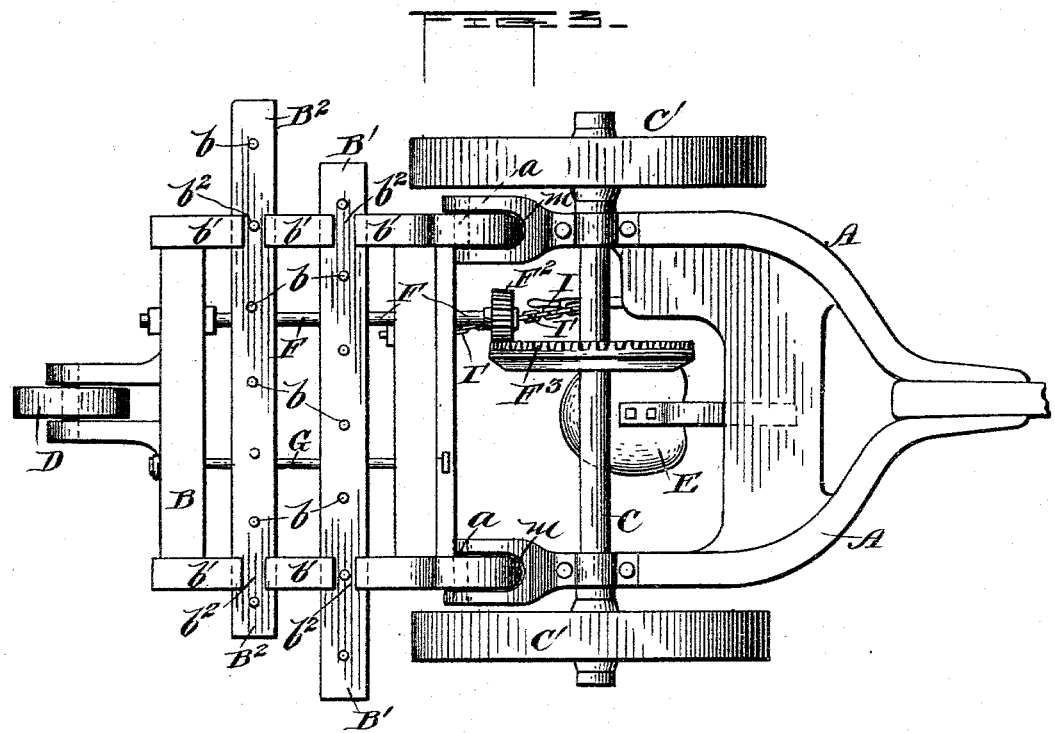
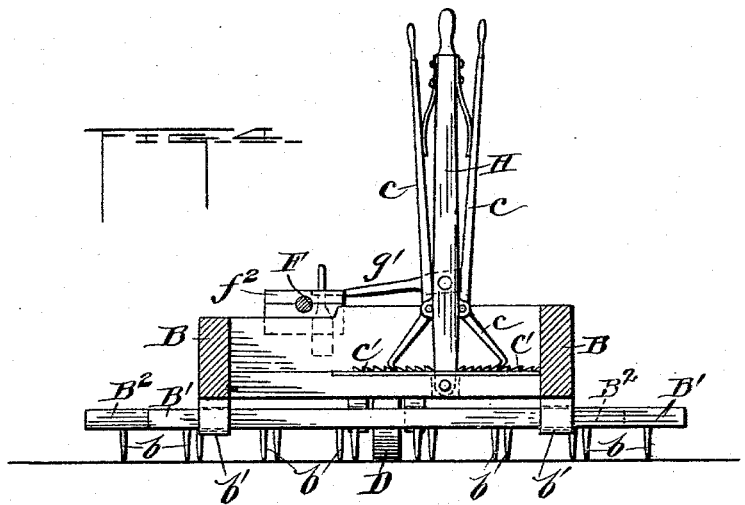
Witnesses: Inventor:
Severance. Frank Anderson
C. Calvert Hines by his Attorneys
Mason, Fenwick and Lawrence
THE NORRIS PETERS CO., PHOTO-LITHO., WASHINGTON, D. C.

UNITED STATES PATENT OFFICE.

FRANK ANDERSON, OF SHOALS, INDIANA.

WHEELED HARROW.

SPECIFICATION forming part of Letters Patent No. 490,132, dated January 17, 1893.

Application filed October 6, 1892. Serial No. 448,080. (No model.)

*To all whom it may concern:*

Be it known that I, FRANK ANDERSON, a citizen of the United States, residing at Shoals, in the county of Martin and State of Indiana, have invented certain new and useful Improvements in Wheeled Harrows; and I do hereby declare the following to be a full, clear, and exact description of the invention, such as will enable others skilled in the art to which it appertains to make and use the same.

My invention relates to a clod breaking harrow supported upon a wheeled carriage, and it consists mainly in a novel combination of two or more harrow bars arranged upon bottom guides in an adjustable frame hung upon the wheeled carriage, one harrow bar reciprocating in one direction and the other in an opposite direction by the same crank shaft, and thus, while the clods beneath the harrow teeth are broken by the weight and travel of the harrow over the ground those clods which are thrown between the sides of the teeth are torn asunder by the teeth during the reciprocating movements of the harrow bars. Where only one toothed bar reciprocates, only the clods beneath the teeth are broken up, but where two or more toothed bars reciprocate in opposite directions alongside one another, clods both beneath and between the sides of the teeth are acted upon, and thus a very thorough disintegration of the earth is effected.

My invention also consists in certain novel features of construction; and other combinations of parts, in a wheel harrow, as will be hereinafter described and claimed.

In the drawings, Figure 1 is a top plan view of my improved wheel harrow; Fig. 2 a vertical longitudinal section of the same; Fig. 3 an inverted plan view, and Fig. 4 a vertical transverse section.

A in the drawings is a wheeled frame, B the harrow frame; the frame A swings on an axle C supported by wheels C', while the frame B is hung on pivots $a$ to the frame A, and supported at its rear end on a center wheel D. The carriage frame is provided with a seat E mounted on a standard of the platform of the frame, so as to be forward of the axle. The harrow bars B' B² are provided with teeth $b$ and arranged in open bottomed guide-ways $b'$ on the underside of the frame, so that the teeth can pass through the openings $b^2$, in the bottoms of the guide-ways; and they are placed close enough alongside one another to insure the tearing asunder of the clods which pass unbroken from beneath the teeth.

For reciprocating the bars, a shaft F having two or more crank arms $f$ and connected by pitmen F' to the toothed bars, is provided; this shaft is fitted on laterally sliding bearing-blocks $f^2$; and for moving these blocks so as to throw a pinion F² on the crank shaft, into and out of gear with a toothed wheel F³ on the axle C, and thereby start and stop the reciprocating movements of the toothed harrow bars B' B², a rocking bar G is provided, said bar being connected to the sliding blocks $f^2$ by rods $g'$. The rocking bar G is pivoted to the rear of the harrow frame B by one end, and its other end is connected to a pivoted hand lever H which is attached to the front end of the harrow frame. To the lever H, right and left spring acted pawls $c$ $c$ are fastened, and these pawls catch into right and left ratchet stop plates $c'$ $c'$, and thus the pinion F² of the double armed crank shaft is kept in or held out of gear with the toothed wheel F³ of the carriage axle.

In order to raise the harrow on its pivots, off the ground, a hand lever I and chain I' are provided; and to retain it in an elevated position, a hooking spring acted lever pawl I² and a keeper I³ are provided.

At the points where the harrow frame is pivoted, the beams of the carriage frame are slotted as indicated by $m$, and the bases of these slots are concaved concentrically with the pivots $a$ so as to conform to the curvatures $a'$ of the forwardly and upwardly extended side beams of the harrow frame. By this construction, room is afforded for the forward ends of said beams to move in while the harrow is being raised. Below this concentric portion, the bases of the slots are made on straight oblique lines, as indicated at $n$, so that the harrow frame shall be kept from descending too far below a horizontal plane independently of the carriage frame, but should the frame require to undulate it can do so on the axle C, and carry the harrow with it. The walls of the slots $m$ in the ends of the sid bars of the carriage frame form strong guide for the side beams of the harrow frame, and thus a protection against side-wise strain coming too much upon the pivots is provided.

My harrow is simple and convenient of manipulation, and as it is supported on a rear wheel, and by a wheeled carriage frame, its movement is easy upon the horses.

What I claim as my invention is:—

1. The combination of the pivoted and adjustable harrow frame, a plurality of laterally reciprocating harrow bars, a shaft having a plurality of reversely set crank arms, a wheeled carriage, and a single set of gears, on the axle and on the crank shaft, substantially as described.

2. In combination, the wheeled frame, the harrow frame pivoted to said frame, a plurality of laterally reciprocating harrow bars, a shaft having a plurality of reversely set crank arms, pitmen, sliding bearing blocks for the crank shaft, connecting rods, a rocking bar, a hand lever having latching pawls, ratchet plates, and a single set of gears, on the axle and crank shaft, substantially as described.

In testimony whereof I hereunto affix my signature in presence of two witnesses.

FRANK ANDERSON.

Witnesses:
W. L. STILWELL,
S. N. GWIN.